July 7, 1964

G. E. LAUER 3,139,993

PALLET UNLOADER

Filed June 6, 1960

INVENTOR
GEORGE E. LAUER
BY
Gardner & Zimmerman
ATTORNEYS

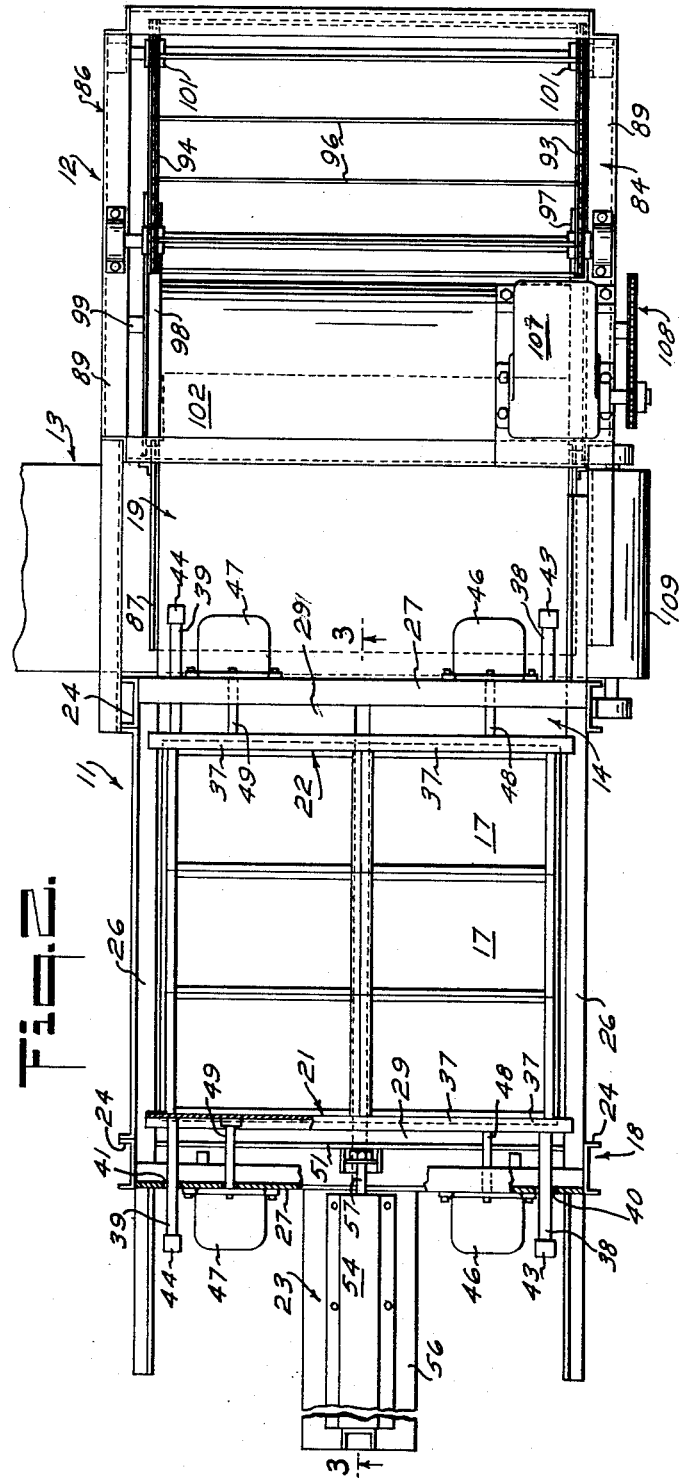

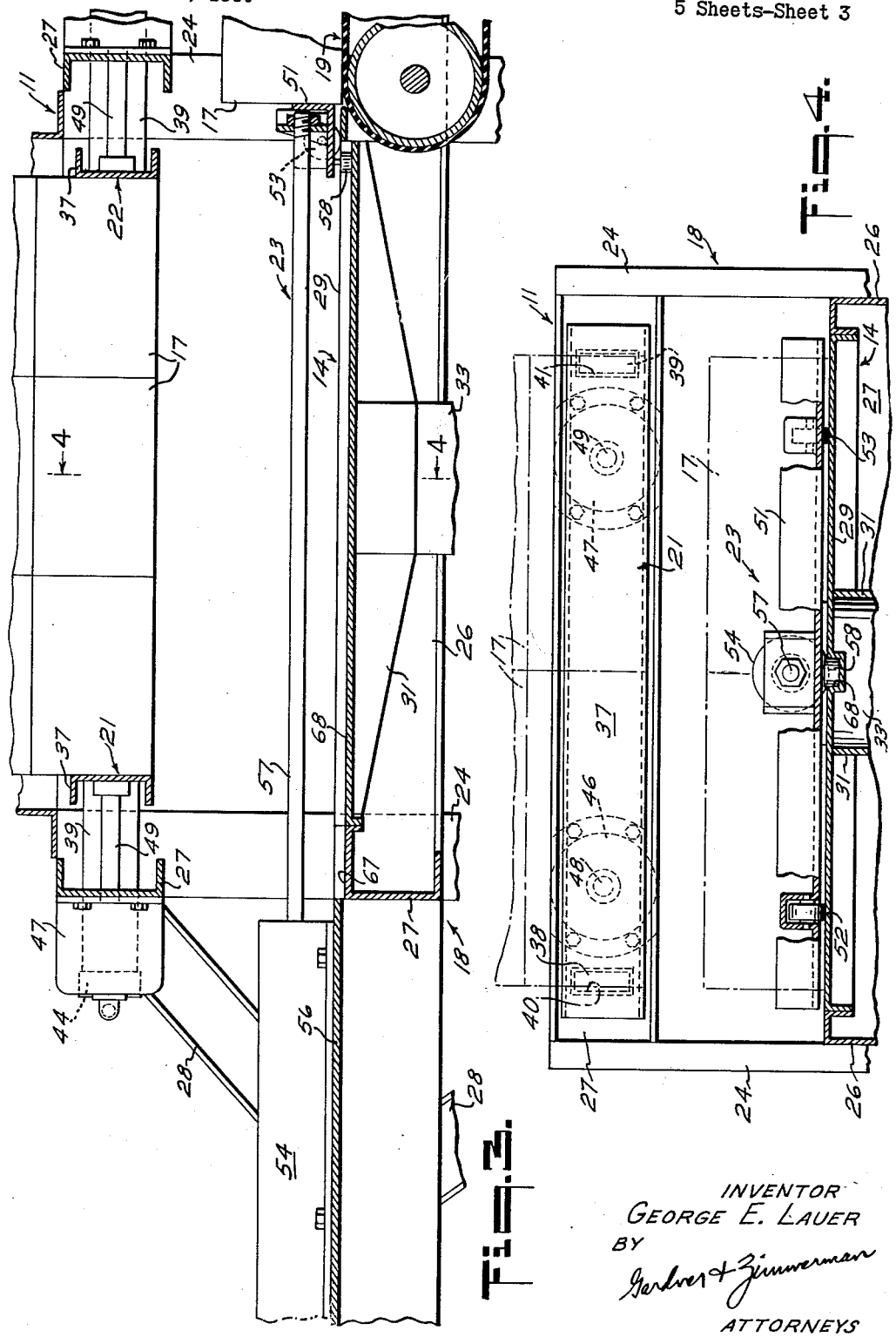

July 7, 1964
G. E. LAUER
3,139,993
PALLET UNLOADER
Filed June 6, 1960
5 Sheets-Sheet 4
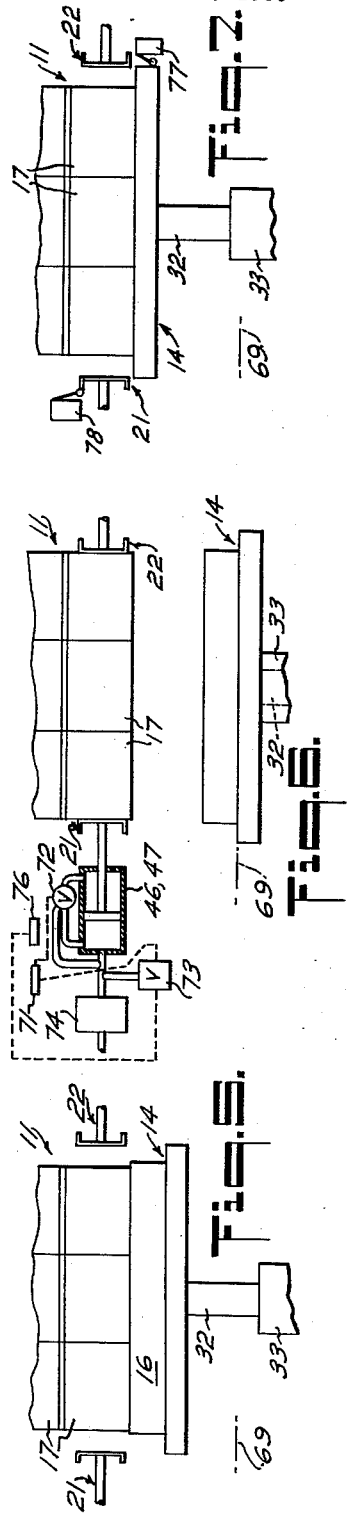
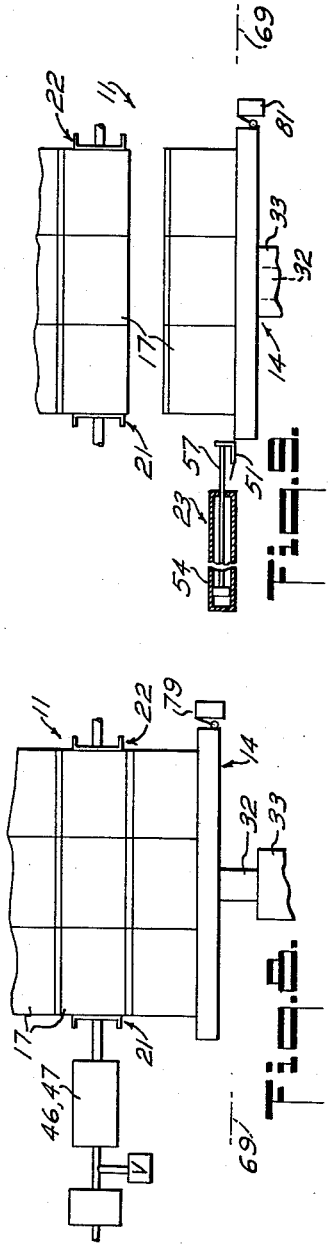
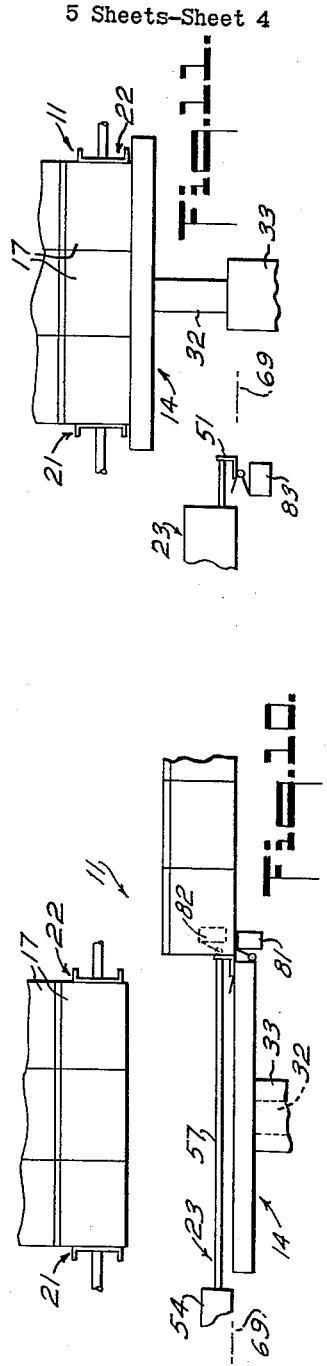
INVENTOR
GEORGE E. LAUER
BY
Gardner & Zimmerman
ATTORNEYS

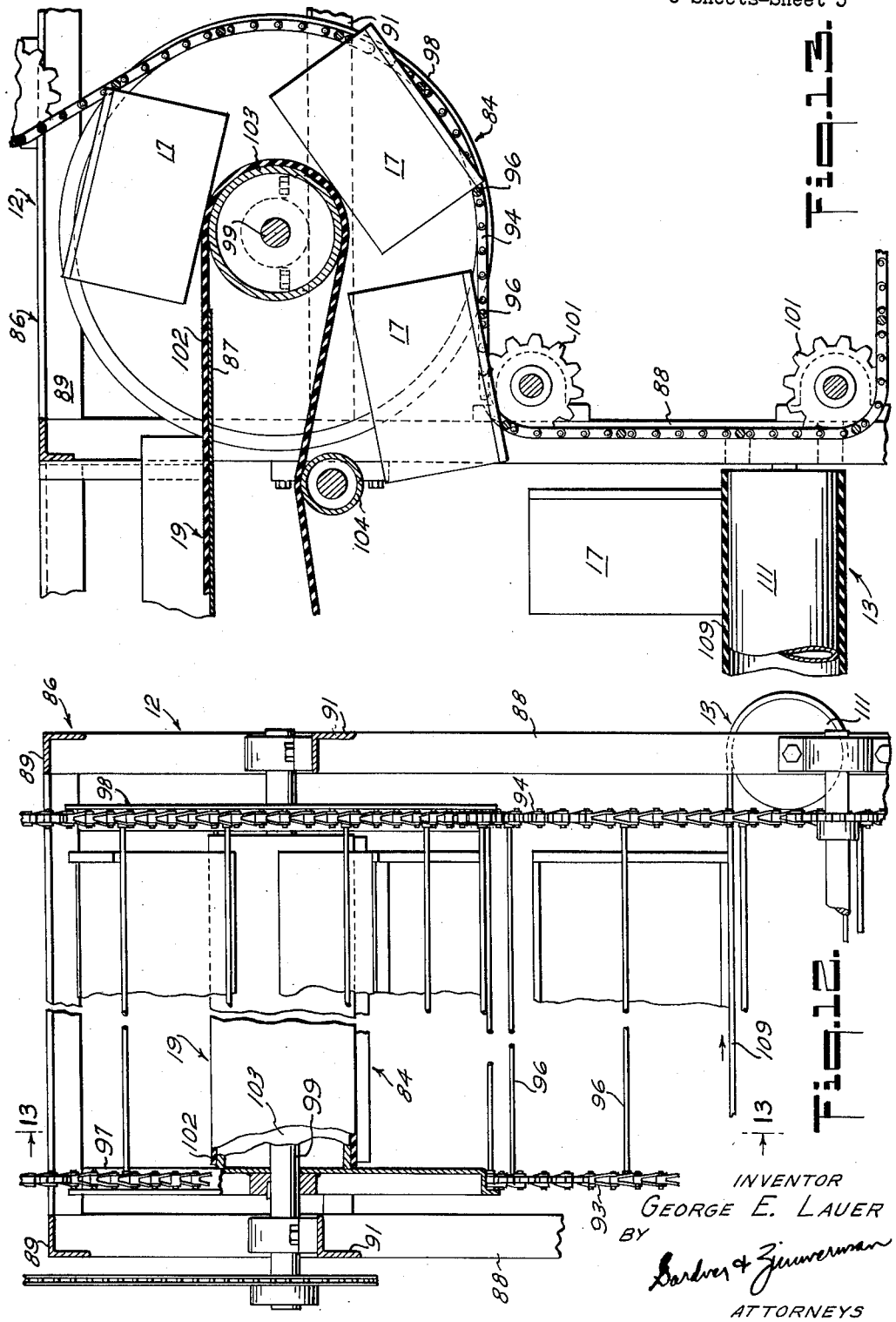

United States Patent Office 3,139,993
Patented July 7, 1964

3,139,993
PALLET UNLOADER
George E. Lauer, % Melrose Sheet Metal Co.,
2960 Chapman, Oakland, Calif.
Filed June 6, 1960, Ser. No. 34,106
2 Claims. (Cl. 214—8.5)

This invention relates to the unloading of boxes or the like, and is particularly directed to the automatic unloading of the contents of boxes stacked upon a pallet.

In the conveyance of fruit, vegetables, and other produce from orchard, field, and the like to a cannery or other food processing facility, the produce is customarily loaded into lug boxes. Groups of the loaded lug boxes are then conventionally stacked upon pallets to facilitate handling of a number of boxes at one time during shipment. Each pallet of stacked boxes may be readily handled as by means of a fork lift or the like.

Upon receipt of the loaded pallets at their destination, it has heretofore been the practice to manually remove the individual boxes from the pallets and unload the contents of the boxes as by dumping same into a conveyor system. These manual unloading operations are both labor and time consuming.

Substantial advantages are therefore to be gained by the provision of means for the automatic unloading of the contents of boxes stacked upon a pallet.

It is therefore an object of my invention to provide an automatic pallet unloader in which the entire load of boxes are mechanically removed from the pallet and dumped in a rapid and efficient manner.

Another object of the invention is the provision of a machine for receiving a loaded pallet of stacked boxes from a fork lift or the like and, at the command of an operator, automatically rapidly dumping the contents of the boxes of respective layers of the stacks in succession.

Still another object of the invention is the provision of a machine for conducting a unique pallet unloading procedure wherein the stacks of boxes are suspended while the pallet is removed and thereafter layers of boxes are removed from the stacks in bottom to top succession, for dumping of their contents.

It is a further object of the invention to provide a machine of the class described wherein the possibility of box breakage and content damage is substantially eliminated.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adapted within the scope of the invention as set forth in the claims.

FIGURE 2 is a plan view of the unloader.

FIGURE 3 is a cross-sectional view taken at line 3—3 of FIGURE 2 and illustrating particularly the box clamping means and box pusher means of the unloader.

FIGURE 4 is a cross-sectional view taken at line 4—4 of FIGURE 3.

FIGURES 5 to 11 are schematic representations of the the sequence of operations conducted by the unloader in removing boxes from a pallet.

FIGURE 12 is an elevational cross-sectional view of the unloader taken at line 12—12 of FIGURE 1 depicting the box emptying portion thereof in operation.

FIGURE 13 is a cross-sectional view taken at line 13—13 of FIGURE 12 and further illustrating the box emptying portion of the unloader in operation.

Figure 1:
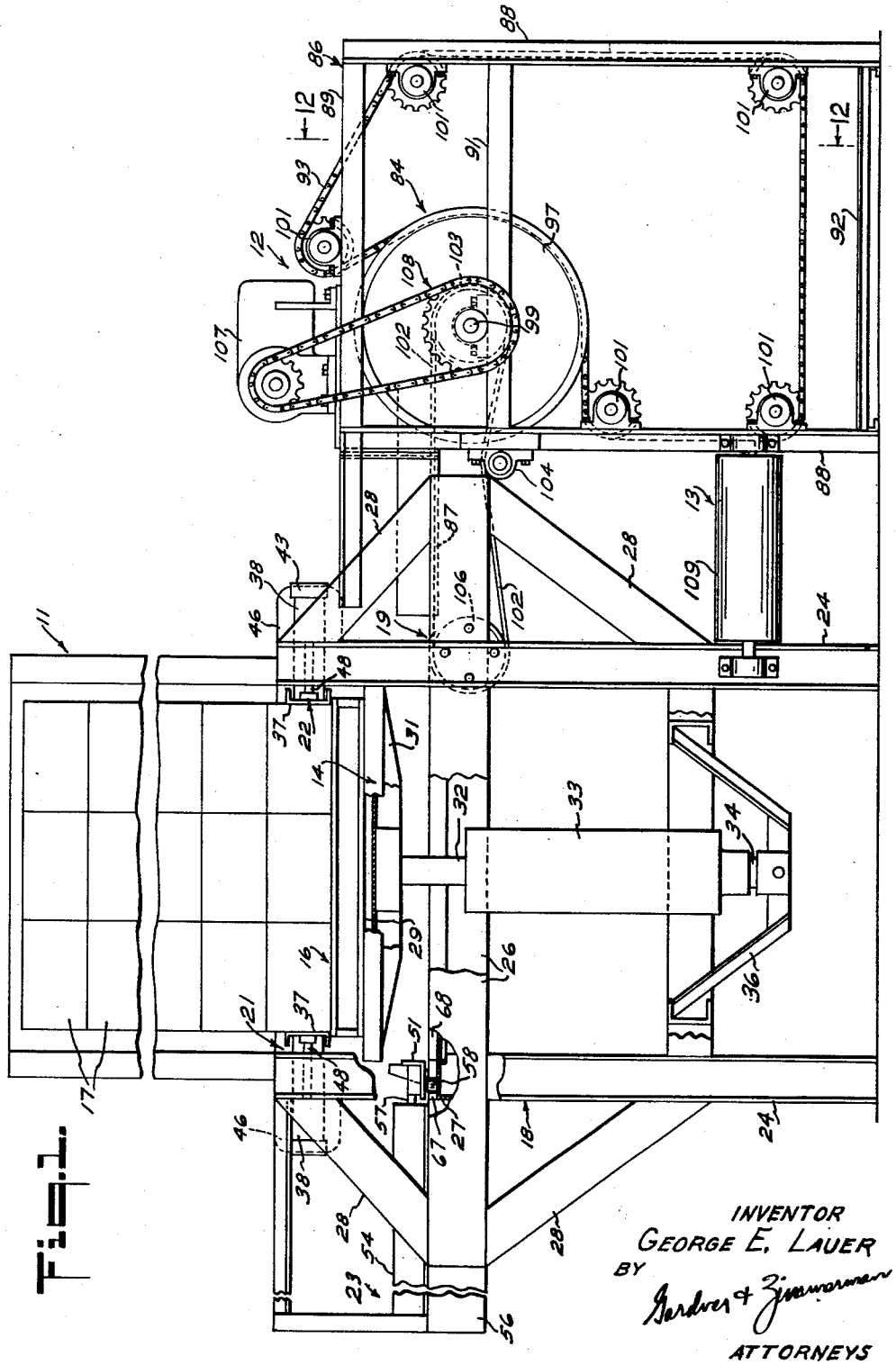
FIGURE 1 is a side elevational view of a pallet unloader in accordance with the present invention.

Considering now the invention in some detail and referring to the illustrated form thereof in the drawings, there is provided an automatic pallet unloader for conducting a sequence of operations in automatic fashion whereby the boxes stacked upon a pallet are removed, their contents emptied for further processing, and the empty boxes dispatched to a collection point. Although a single preferred embodiment is illustrated in the drawings and detailed herein, it will be appreciated that the sequence of operations thereby conducted may alternatively be accomplished by other and different apparatus or in part by hand.

More specifically, referring to FIGURES 1 and 2, there is provided by the persent invention a pallet unloader which broadly includes a box unloader section 11, a box emptying section 12, and an empty box conveyor section 13. Lug boxes of fresh fruit or vegetables are conventionally shipped and received at their destination in stacks arranged side by side and end to end upon pallets. In accordance with the present invention the pallets of stacked boxes are placed as by means of a fork lift in the box unloader section 11. Subsequently and in a unique manner hereinafter described, layers of the stacked boxes are sequentially urged from the unloader section 11 into the box emptying section 12. The contents of the boxes of each layer are dumped or otherwise deposited by the emptying section 12 upon for example a continuous conveyor into a food processing plant. The empty boxes are also delivered by the emptying section to the empty box conveyor section 13. The empty box conveyor section in turn transports the empty boxes to a remote point for collection and reuse.

As regards the box unloader section 11, it will be appreciated that layers of the stacked boxes may not be readily removed from the stacks if attempted in top to bottom sequence. An upper layer of boxes will not readily slide horizontally relative to an adjacent lower layer of stacked boxes. Direct horizontal displacement of layers of boxes is therefore substantially impossible in top to bottom succession. The layers may of course be removed by lifting the uppermost layer vertically upward, shifting the layer horizontally beyond the stacked boxes, and vertically lowering the layer to a receiving platform. This procedure, however, is relatively complicated and time consuming. Therefore, in accordance with the present invention, the unloader section 11 of the present invention is arranged to remove the boxes stacked upon a pallet layer by layer in bottom to top sequence. More specifically, unloader section 11 includes a lift platform 14 for receiving a pallet 16 of stacked boxes 17. The platform is mounted for controlled translation vertically of a superstructure 18 between predetermined upper limits and a lower limit wherein the top of the lift platform is coplanar with the upper reach of a conveyor 19 extending generally from the box unloader section to the box emptying section 12. Clamp means 21 and 22 are additionally carried by the superstructure and arranged for coaction with the lift platform to clamp layers of the boxes therebetween and release the layers when the platform passes various of the limits. By such arrangement the loaded pallet 16 may be placed upon lift platform 14 at one of its upper limits as by means of a fork lift. Under the control of an operator the unloader section 11 may be actuated whereupon clamp means 21 and 22 responsively clamp the lowermost layer of stacked boxes 17 and the lift platform 14 descends to its lower limit. In such manner the clamp means 21 and 22 support the stacked boxes in an elevated position relative to the lift platform 14 and pallet 16 carried thereon. The pallet is removed and the unloader section 11 again actuated, the lift platform 14 then ascending to one of its upper limits wherein the lower layer of elevated boxes is engaged. Thereafter the lift platform and clamp means coact to automatically release the lowermost layer of boxes, convey the entire stacks of boxes downward, and clamp the next upwardly adjacent layer of boxes. The lowermost layer of boxes is thereby freed from the remainder of the stacks and supported upon the lift platform. The lift platform then descends to its lower limit, separating the lower layer of boxes from the clamped boxes above the same, the lower layer of boxes being thus carried to the level of the conveyor 19.

Also included in the unloader section 11 is a hydraulic ram 23 or equivalent pusher means carried upon superstructure 18 in coplanar relation to the conveyor 19. The ram 23 is also coactively arranged with lift platform 14 and clamp means 21 and 22 to horizontally push or shove the lower layer of boxes from the lift platform 14 onto the conveyor 19 for delivery to the box emptying section 12. The lift platform 14, clamp means 21 and 22, and ram 23 thereafter function in a like manner to cyclically remove layers of boxes from the stacks in bottom to top succession and deliver the layers to the conveyor 19 for the aforementioned purpose.

Considering now the preferred structure of the various components of the unloader section 11 illustrated in the drawings, it is to be noted that the superstructure 18 is provided as a generally rectangular framed structure of vertical channel members 24 interconnected by longitudinally and transversely extending frame members 26 and 27 respectively. The horizontal frame members 26 project forwardly and rearwardly beyond the superstructure 18, such projections being braced by means of diagonal strut members 28 secured between the vertical and horizontal members 24 and 26. The terms "forwardly" and "rearwardly" as herein used refer to the direction of travel of conveyor 19 and ram member 23, rather than the direction in which the loaded pallets are initially positioned on the platform.

The lift platform 14 comprises a horizontal plate 29 which is centrally secured to the upper end of a piston 32 of hydraulic cylinder means 33 or the like mounted in vertical position centrally of superstructure 18. Suitable bracing means 31 depending from the plate 29 and secured to the piston provides rigid support of the plate 29 relative to the piston. The hydraulic cylinder means 33 preferably includes two opposed hydraulic cylinders with the piston 32 being of one cylinder and a piston 34 being of the other. The piston 34 is rigidly end secured to a mounting well 36 rigidly horizontally secured within the superstructure 18. The entire cylinder means 33 is hence vertically displaceable with respect to the well 36 and the piston 32 and plate 29 secured thereto are further vertically displaceable relative to the cylinder means 33. Such double lifting action facilitates the ready establishment of three upper limits of translation of the lift platform 14, a first limit being commensurate with a full stroke of only piston 32, a second limit being commensurate with a full stroke of only piston 34, and an extreme upper limit being commensurate with full strokes of both pistons 32 and 34, and likewise minimizes the vertical height requirements of the apparatus.

Considering now the clamp means 21 and 22 it should be noted that each one thereof preferably comprises a transverse clamping member 37 of channel iron or the like (see FIGURES 3 and 4). The clamping members are disposed adjacent the upper end of the superstructure 18 in opposed relation inwardly adjacent opposite sets of vertical members 24. At the ends of each clamping member 37 there are secured right angularly projecting guide rails 38 and 39 (see FIGURE 2) respectively longitudinally slideable in vertical slots 40 and 41 provided in the transverse frame members 27. The ends of guide rails 38 and 39 are provided with enlarged stop portions 43 and 44 which limit the longitudinal displacement of the rails and therefore of each clamping member 37. In order to facilitate controlled translation of the clamping members into and out of clamping engagement with layers of the stacked boxes 17 in the manner noted hereinbefore, a pair of double acting pneumatic cylinders 46 and 47 or equivalent means are operatively coupled to the clamping members. More particularly, the cylinders are rigidly secured to the respective cross members 27 and the pistons 48 and 49 thereof are end secured to the adjacent clamping members at transversely spaced positions intermediate the guide rails 38 and 39. By appropriate control of the flow of compressed air to the cylinders 46 and 47 in a manner well known in the art, the pistons 48 and 49 thereof may be responsively reciprocated as desired to in turn urge the clamping members into and out of engagement with the stacked boxes 17.

Referring now to the ram 23 as shown in FIGURE 1, the same will be seen to be suitably mounted rearwardly of the superstructure 18 intermediate the projection of longitudinal members 26 and coplanar with the conveyor 19. The ram is preferably provided as a transverse pushing member 51 of angle iron or the like arranged for pneumatically or hydraulically controlled longitudinal translation from an inoperative position at the left of the platform 14 (see FIGURES 1 and 3) to an operative position moving across lift platform 14 to the conveyor 19. To this end, the pushing member 51 is provided with a pair of rollers 52 and 53 journalled for rotation about a transverse axis proximate its ends. A pneumatic cylinder 54 is mounted on a platform 56 which extends rearwardly of the superstructure 18. The piston 57 of such cylinder is secured at its free end to the member 51. In addition, the members 51 is provided with a centrally located depending guide roller 58 which is adapted to ride in a longitudinally extending guide slot 67 provided medially of a subjacent transverse frame member 27 and a medial longitudinal guide slot 68 in plate 29 of lift platform 14 which is coextensive with slot 67 when the lift platform is at its lower limit of vertical translation. Hence with the piston 57 retracted within cylinder 54, pushing member 51 is disposed upon the subjacent transverse member 27 as shown in FIGURE 1. When compressed air is appropriately fed to the cylinder in a well known manner to force the piston towards the opposite end of the cylinder, the pushing member 51 is forced longitudinally across the platform to the conveyor 19 as illustrated in FIGURE 3. A layer of boxes 17 positioned upon lift platform 14 is thereby pushed longitudinally from the lift platform onto the conveyor 19. By further control of air fed to cylinder 54 the piston is urged in reversed directions to retract the pushing member to the inoperative position atop member 27 as shown in FIGURE 1.

Considering now in particular detail the sequence of operations conducted in the box unloader section 11 of the pallet unloader, and referring to the schematic illustrations depicted in FIGURES 5 to 11, the lift platform 14 is initially at the second upper limit (see FIGURE 5), vertically elevated relative to its lower limit as indicated at 69. As noted previously, the lower limit 69 corresponds to the level of the conveyor 19 and the ram supporting platform 56, and the platform is placed at its second upper limit by a full stroke of the piston 34. In the initial intermediate position of the lift platform at the second upper limit the pallet 16 with the stacked boxes 17 is placed thereon and such second limit is positioned relative to the clamp means 21 and 22 such that the lower layer of stacked boxes is horizontally opposite same. The second upper limit is vertically spaced below the extreme upper limit by an amount substantially equal to the height of pallet 16 which is conventionally 5 inches, as will become more evident from the following.

The unloader section 11 may now be actuated whereupon the lower level of stacked boxes 17 is clamped and thus all of the stacks held by the clamp means 21 and 22 while the lift platform with pallet 16 supported thereon descends to lower limit 69 as shown in FIGURE 6. The foregoing is accomplished as by pulling a valve cord depicted at 71 or otherwise simultaneously actuating a control valve 72 and a control valve 73 for respectively feeding air or other operating fluid from a reservoir 74 to the clamp actuating cylinders 46 and 47 and the lift actuating cylinder means 33. The pallet 16 is then removed from the lift platform 14, such as by the fork lift which initially deposited the loaded pallet onto the platform.

The platform 14 is next raised to its extreme upper limit which is flush with the bottom surface of the lower level of boxes clamped by the clamp means 21 and 22, as shown schematically in FIGURE 7. This may be accomplished in practice as by pulling a second valve cord 76 operatively connected to control valve 73 to actuate same in such a manner as to feed operating fluid to both cylinders of the lift platform cylinder means 33. As the platform 14 attains its extreme upper limit, a limit switch 77 or the like is tripped to in turn actuate the clamp control valve 72 to withdraw the clamp means and release the boxes. As the clamp means approach their retracted positions, a second limit switch 78 or equivalent actuating device is tripped to reverse the fluid actuation of cylinder means 33 by valve 73 and cause the lift platform to descend with the stacks of boxes thereon.

In order that the lower level of boxes supported on the lift platform 14 be uncoupled or separated from the remainder of the stacks, the clamp means 21 and 22 are again actuated at the instant the platform 14 has declined a distance equal to the height of a box 17 (9 inches where lug boxes are concerned) and come to a stop at its first limit. The platform is movable from its extreme upper limit to its first limit position by retraction of the piston 34 leaving only the piston 32 extended. The clamp means then engage the layer of boxes upwardly adjacent the lowermost layer directly supported upon the lift platform as depicted in FIGURE 8. To automatically accomplish this step of the operation, a limit switch 79 for example may be positioned substantially one box height (or 9 inches) below the extreme upper limit of the lift platform. The limit switch 79 is in turn operatively associated with the clamp means control valve 72 to effect the indicated clamping actuation of the clamp means 21 and 22.

The lift platform with layer of boxes thereon then continues its descent to lower limit 69 as indicated in FIGURE 9. It is noted that to provide the three upper limits of the platform 14 while accommodating a 5 inch pallet and a 9 inch lug box, the platform will have a total vertical excursion of 14 inches. More particularly, the extreme upper limit, as above noted, is preferably 5 inches above the second limit and 9 inches above the first limit. Thus by having a 9 inch stroke for the piston 34 and a 5 inch stroke for the piston 32 the foregoing spatial relations can be achieved in the manner described. With lift platform 14 at lower limit 69, the layer of boxes is shoved horizontally onto the conveyor belt 19 as by means of the ram 23. To accomplish this end automatically, a limit switch 81 may be disposed at lower limit 69 and operatively coupled to a control valve (not shown) for controlling the flow of working fluid to the ram actuating cylinder 54. The ram is responsively actuated as indicated in FIGURE 10 to shove the layer of boxes from the lift platform 14 onto the conveyor 19 leading to the box emptying section 12. The ram is thereafter returned to its retracted position and this is best automatically effected by the provision of a limit switch 82 adjacent the conveyor 19 for effecting a reversal in the fluid actuation of the ram actuating cylinder 54.

With the ram in retracted position, the lift platform 14 is again raised to its extreme upper limit in engagement with the lower layer of boxes supported by the clamp means 21 and 22. This is readily accomplished automatically by means of a limit switch 83 disposed upon ram supporting platform 56 for engagement by the ram upon its return to retracted position. The limit switch 83 is arranged to actuate the lift control valve 73 to supply operating fluid to the lift actuating cylinder means 33 in appropriate fashion to translate the lift platform to its extreme upper limit. Thereafter the cycle is automatically repetitiously conducted in similar fashion to deliver the stacked boxes to the receiving platform 19 by layers in bottom to top succession. When all of the boxes have been removed, actuation of clamp means 21 and 22 will result in the latter sensing the end of the operation and suitable return of all parts to their normal positions.

Considering now the preferred structure of the box emptying section 12 of the unloader, as noted previously the same is arranged to receive the layers of boxes delivered to the conveyor 19 from the unloader section 11 and dump or otherwise deliver the box contents to a conveyor or the like. To this end the emptying section 12 is preferably provided as a driven box inversion conveyor 84 supported upon a superstructure 86 secured to the forward portion of the superstructure 18. The superstructure 86 is generally of rectangular framed construction including vertical corner members 88 interconnected by top, intermediate, and bottom cross members 89, 91, and 92. The inversion conveyor 84 preferably comprises a pair of transversely spaced endless drive chains 93 and 94 interconnected by a plurality of longitudinally spaced bars 96. The drive chains 93 and 94 respectively engage a pair of transversely spaced drive sprockets 97 and 98 interconnected by an axle 99 which is journalled upon intermediate cross members 91 for rotation about an axis transversely of the superstructure 86 in the upper corner portion thereof. The drive chains engage only lower inner segment portions of the sprockets and in general are guided about the elevational perimeter of the superstructure by means of a plurality of idler sprockets 101 journalled for rotation thereon. The drive chains in engaging sprockets 97 and 98 are diverted arcuately downward from the top of the superstructure adjacent the conveyor 19.

The continuous conveyor 19 is arranged to deliver the boxes in upright position substantially horizontally to the bars 96 secured between the inversion conveyor chains 93 and 94 during the latter's engagement with the sprockets 97 and 98. The boxes are engaged in the spaces between adjacent bars during their course arcuately downward and supported upon the bars in inverted position as they are diverted horizontally outward by the sprockets. More specifically, the conveyor 19 comprises an endless belt 102 which is driven by a drum 103 secured concentrically about axle 99 between the drive sprockets 97 and 98. The belt 102 passes horizontally over a fixed plate 87 and around the drum 103 to then pass over a roller 104 journalled between the proximate set of corner members 88 of superstructure 86. The belt then passes around an idler drum 106 journalled for rotation between a proximate set of vertical channel members 24 of superstructure 18 for return to the top of the fixed plate 87. The radial spacing between the periphery of drum 103 and the circumference of sprockets 97 and 98 is substantially equal to the height of the boxes 17.

Accordingly, with the conveyors 84 and 19 driven in clockwise direction (as viewed in FIGURE 1) as by means of a motor 107 supported atop superstructure 86 and coupled as by means of a chain and sprocket drive 108 to axle 99, the layers of boxes 17 delivered to conveyor 19 from the unloader section 11 are translated longitudinally across the plate 87 upon belt 102 of conveyor 19. As the boxes are carried around the drum 103 upon the belt, they are engaged by the inversion conveyor bars 96 spaced radially outward therefrom as depicted in FIGURE 13. Hence the boxes ride between the belt and bars through an angle of substantially 180° and are inverted. The contents of the boxes are consequently emptied to an area of superstructure 86 beneath the region of drive sprockets 97, 98 and axle 99 whereat a collection conveyor (not shown) or the like may be disposed to carry the contents to a remote location for processing. Subsequent to being emptied, the boxes are carried substantially horizontally outward upon the bars 96 of conveyor 84 to the side of the superstructure 86 proximate the conveyor 19 and fall vertically downward to the region beneath the platform.

As regards the empty box conveyor section 13 of the pallet unloader, it will be noted that same is preferably provided as an endless belt 109 which is disposed to in part pass transversely through the space beneath conveyor 19 in receiving relation to the boxes falling downward from inversion conveyor 84. More specifically, the belt 109 passes around a drum 111 which is journalled for rotation about a longitudinal axis extending between the front portions of the superstructures 18 and 86. The belt 109 then extends from the drum 111, transversely between the superstructures to a remote collection point (not shown). The belt 109 may be driven in any desired manner as from drive means (not shown) disposed at the collection point. By means of the belt 109, the empty boxes are continuously transported to the collection point whereat they may be collected for reuse.

What is claimed is:

1. A pallet unloader comprising a superstructure having a receiving platform supported to one side thereof, a lift platform mounted for translation vertically of the superstructure between the level of said receiving platform and an elevated limit, vertically stationary clamp means carried by said superstructure for controllably engaging and retaining boxes stacked upon a pallet supported upon said lift platform whereby the pallet may be removed from beneath the boxes, a ram carried by said superstructure at the level of said receiving platform for controllably horizontally urging a layer of boxes supported upon said lift platform onto said receiving platform, and automatic control means for sequentially effecting engagement of the lower level of stacked boxes by the clamp means, upward translation of the lift platform to an upper position for supporting said boxes, release of the boxes by the clamp means, downward translation of the lift platform to an intermediate stationary position spaced above said receiving platform, engagement of the clamp means with the layer of boxes upwardly adjacent the lower layer, further downward translation of said lift platform to the level of said receiving platform, actuation of said ram subsequent to arrival of the lift platform at said level of said receiving platform to deliver a layer of boxes thereto, and repetition of the previous sequence commencing with the engagement of the lower level of boxes by the clamp means, said control means including a vertically disposed hydraulic cylinder having a pair of piston rods extending respectively one from each end thereof with each rod secured respectively to one of a pair of pistons disposed in said cylinder, one of said rods being secured at its extended end to said lift platform and the other rod being secured at its extended end to said superstructure, said upper position of said lift platform corresponding to full extension of both said rods, said intermediate position of said lift platform corresponding to full extension of one of said rods with the other said rod fully retracted, and said positioned of said lift platform at said level of said receiving platform corresponding to full retraction of both said rods.

2. A pallet unloader comprising a superstructure having a receiving platform supported to one side thereof, a lift platform mounted for translation vertically of the superstructure, double acting fluid actuated cylinder means carried by said superstructure and connected to said lift platform and adapted to translate same between the level of said receiving platform and first, second, and third upper stationary positions displaced progressively vertically upward from said receiving platform, and vertically stationary clamp means carried by said superstructure adapted to engage the lower layer of boxes stacked upon a pallet and supported on said lift platform when the latter is positioned at said second position, said clamp means further adapted to engage the second lowest layer of boxes stacked directly on said lift platform when the latter is positioned at said first position, said double acting cylinder means including a vertically disposed hydraulic cylinder having a pair of piston rods extending respectively one from each end thereof with each rod secured respectively to one of a pair of pistons disposed in said cylinder, one of said rods being secured at its extended end to said lift platform and the other rod being secured at its extended end to said superstructure, said first position of said lift platform corresponding to the full extension of one said piston rod with the other rod fully retracted, said second position of said lift platform corresponding to the full extension of the other said piston rod with said one rod retracted, said third position of said lift platform corresponding to the full extension of both said piston rods, and said position of said lift platform at said level of said receiving platform corresponding to full retraction of both said piston rods.

References Cited in the file of this patent
UNITED STATES PATENTS

| | | |
|---|---|---|
| 2,127,007 | Paxton | Aug. 16, 1938 |
| 2,254,550 | Stevenson | Sept. 2, 1941 |
| 2,526,309 | Welch | Oct. 17, 1950 |
| 2,540,766 | Stilwell | Feb. 6, 1951 |
| 2,702,132 | Van Doren | Feb. 15, 1955 |
| 2,792,133 | Warner | May 14, 1957 |
| 2,844,263 | Dreyer | July 22, 1958 |
| 2,858,043 | Fenton | Oct. 28, 1958 |
| 2,889,944 | Clark | June 9, 1959 |
| 2,934,221 | Tonna | Apr. 26, 1960 |
| 3,010,588 | McBean | Nov. 28, 1961 |
| 3,038,615 | Roth | June 12, 1962 |
| 3,053,402 | Russell | Sept. 11, 1962 |
| 3,074,595 | Boller | Jan. 22, 1963 |